United States Patent
Borrelli et al.

(10) Patent No.: US 6,619,073 B2
(45) Date of Patent: *Sep. 16, 2003

(54) METHOD OF INCREASING THE INITIAL TRANSMITTANCE OF OPTICAL GLASS

(75) Inventors: Nicholas F. Borrelli, Elmira, NY (US); Daniel R. Sempolinski, Painted Post, NY (US); Thomas P. Seward, Alfred, NY (US); Charlene M. Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/045,238

(22) Filed: Oct. 23, 2001

(65) Prior Publication Data

US 2002/0194869 A1 Dec. 26, 2002

Related U.S. Application Data

(63) Continuation-in-part of application No. 09/142,713, filed as application No. PCT/US97/03100 on Feb. 28, 1997, now abandoned.
(60) Provisional application No. 60/012,941, filed on Mar. 6, 1996, and provisional application No. 60/012,881, filed on Mar. 5, 1996.

(51) Int. Cl.[7] .............................................. C03B 19/01
(52) U.S. Cl. ...................... 65/30.1; 65/17.4; 65/30.13; 65/900
(58) Field of Search ....................... 65/32.1, 157, 17.4, 65/900, 30.1, 30.13; 501/54, 900

(56) References Cited

U.S. PATENT DOCUMENTS

| 3,220,814 A | 11/1965 | Haven et al. |
| 5,325,230 A | 6/1994 | Yamagata et al. |
| 5,410,428 A | 4/1995 | Yamagata et al. |
| 5,616,159 A | 4/1997 | Araujo et al. |
| 5,668,067 A | 9/1997 | Araujo et al. |
| 5,773,486 A | 6/1998 | Chandross et al. |

FOREIGN PATENT DOCUMENTS

| JP | 60-90853 | 5/1985 |
| JP | 1-201664 | 8/1989 |
| JP | 6-24997 | 4/1994 |
| JP | 6-48734 | 6/1994 |
| JP | 6-166522 | 6/1994 |
| JP | 6-166528 | 6/1994 |
| JP | 6-53593 | 7/1994 |

OTHER PUBLICATIONS

D.R. Sempolinski, T.P. Seward, C. Smith, N. Borrelli, C. Rosplock, entitled *Effects Of Glass Forming Conditions On The KrF–Excimer–Laser–Induced Optical Damage In Synthetic Fused Silica*, Journal of Non–Crystalline Solids 203 (1996) pp. 69–77.

H. Imai, K. Arai, T. Saito, S. Ichimura, H. Nonaka, JP. Vigourous, H. Imagawa, H. Hosono, Y. Abe, entitled *UV an VUV Optical Absorption Due to Intrinsic and Laser Induced Defects in Synthetic Silica Glasses*, pp. 153–179.

*Primary Examiner*—James Derrington
(74) *Attorney, Agent, or Firm*—James V. Suggs; Edward F. Murphy

(57) ABSTRACT

The invention relates to optical glass having improved initial transmittance, formed by subjecting the glass to a hydrogen and/or deuterium treatment at a temperature, and for a duration of time sufficient to diffuse the hydrogen and/or deuterium into the glass.

15 Claims, 8 Drawing Sheets

METHOD OF INCREASING THE INITIAL TRANSMITTANCE OF OPTICAL GLASS

This is a Continuation-In-Part of application Ser. No. 09/142,713 filed on Sep. 10, 1998 now abandoned (of International Application No. PCT/US97/03100, filed Feb. 28, 1997, with Priority claim to U.S. Ser. No. 60/012,881, filed Mar. 5, 1996 and U.S. Ser. No. 60/012,941, filed Mar. 6, 1996.

FIELD OF THE INVENTION

The invention relates to optical glass having high initial transmittance in the ultraviolet spectral region. This inventive glass is particularly useful as an optical material for optical applications in the deep ultraviolet region.

BACKGROUND OF THE INVENTION

In the past, it has been suggested that the resistance of fused silica to laser damage can be improved by treating such glass with hydrogen. The treatments of these previous reports are intended to cause impregnation of high concentrations of molecular hydrogen into the fused silica as the degree of laser damage resistance in such samples is said to be related to the amount of molecular hydrogen doped into the glass. The effect of high concentration of the molecular hydrogen on laser damage resistance in fused silica is reported in numerous publications for example, in JP-Hei 6[1994]-166552; JP-Hei6[1994]-166528; JP-A-1-201664; JP-A-6-48734; JP-A-6-24979; JP-A-6-53593; U.S. Pat. Nos. 5,410,428; 3,220,814.

If fused silica is to be used as an optical material in optical applications in the deep UV, the internal transmittance of the glass at the use wavelengths must be as high as possible. For example, in applications such as lenses for microlithography stepper cameras, where the total path length in glass may be in the 20–50 cm range, an increase in transmittance of 0.01%/cm is significant.

Accordingly, it is the object of the present invention to produce fused silica glass having improved initial transmittance, and to provide a method for producing such glass.

This invention relates to fused silica glass which is resistant to laser damage and a method of making such glass using molecular hydrogen. Specifically, the invention relates to the use of molecular hydrogen to prevent the 190–300 nm optical absorption of fused silica associated with prolonged exposure to radiation within that wavelength.

Although the exact origin, nature and mechanism of formation of the centers that give rise to absorptions in fused silica are not completely understood, these detects can be identified and tracked by optical absorption and/or electron spin resonance techniques. Two categories of defects can be described: the E' center, centered at about 210 nm and an oxygen related defect, having an absorption at about 260 nm with a corresponding fluorescence at 650 nm.

The E' defect structure consists of a paramagnetic electron trapped in a dangling silicon orbital projecting into interstitial space. As the E' center has an unpaired electron it is detectable by electron spin resonance spectroscopy. The induced E' center has a 5.8 eV (210 nm) absorption band and a 2.7 eV (458 nm) fluorescence band. The absorption at 210 nm is particularly deleterious in ArF (193 nm) laser applications as it tails into the irradiating wavelength region of the laser. For applications such as lenses for 193 nm microlithography it is important to minimize or eliminate any optical absorption in this region of the UV spectrum.

The second observed absorption at 260 nm is a consequence of irradiating silica that contains dissolved molecular oxygen. It has been found that the more oxidizing the flame used to make the glasses the more 260 nm absorption is produced with laser irradiation. Along with the 260 nm absorption is formed 1.9 eV (650 nm) red fluorescence. The 260 absorption is undesirable for KrF (248 nm) laser applications as it is very close to the lasing wavelength; its minimization or elimination is important for the successful use of silica in KrF applications.

One model for the formation of the 260 absorption involves the reaction of dissolved molecular oxygen with light to give oxygen atoms. The reactive oxygen atoms further react with molecular oxygen to give ozone (260 nm absorption). The ozone has a radiative transition with a red (650 nm) emission. Alternatively, it should be noted that molecular oxygen has also been theorized to react photolytically with silica. Regardless of the mechanism of formation, it is important to note that the 260 nm absorption is related to the molecular oxygen content of the glass.

In the past, many methods have been suggested for improving the optical damage resistance of fused silica glass. It has been generally known that high purity fused silica prepared by such methods as CVD-soot remelting process, plasma CVD process, electrical fusing of quartz crystal powder, and other similar methods, are susceptible to laser damage to various degrees. This variable propensity to laser damage has been attributed to low OH content, sometimes measuring as low as 10 ppm or less as measured from the value of the beta-OH. Therefore, most commonly, it has been suggested to increase the OH content of such glass to a high level. For example, Escher, G. C., KrF Laser Induced Color Centers In Commercial Fused Silicas, SPIE Vol. 998, Excimer Beam Applications, pp. 30–37 (1988), confirms that defect generation rate is dependent upon the fused silica OH content, and that "wet" silicas are the material of choice for KrF applications. Specifically, they note that high OH content silicas are more damage resistant than low OH silicas, due to their room temperature hydrogen annealing properties.

U.S. Pat. No. 5,086,352 and its related U.S. Pat. No. 5,325,230 also claims that the ability to resist optical deterioration from exposure to a short wavelength ultraviolet laser beam depends on the OH group content in the presence of hydrogen gas. Specifically, these references show that for high purity silica glass having low OH content, KrF excimer laser durability is poor. Thus, they suggest to have an OH content of at least 50 ppm.

Similarly, Yamagata, S., Improvement of Excimer Laser Durability of Silica Glass, Transactions of the Materials Research Society of Japan, Vol. 8, pp. 82–96, 1992, discloses the effect of dissolved hydrogen on fluorescence emission behavior and the degradation of transmission under irradiation of KrF excimer laser ray for high purity silica glass containing OH groups to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., Mechanism of Color Center Destruction in Hydrogen Impregnated Radiation Resistant Glasses, Materials Research Bull., Vol. 5, pp. 385–390, 1970, have disclosed that hydrogen-impregnated glasses tend to resist gamma ray-induced radiation.

Japanese Patent Abstract 40-10228 discloses a process by which quartz glass article made by melting, is heated at about 400.degree. to 1000.degree. C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950° to 1400° C. followed by heat treatment in an oxygen atmosphere at the same temperature range.

Shelby, J. E., Radiation Effects in Hydrogen-impregnated Vitreous Silica, J. Applied Physics, Vol. 50, No. 5, pp. 3702–06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass.

Accordingly, it is the object of the present invention to disclose a method of increasing the resistance of high purity fused silica glass to optical damage.

SUMMARY OF THE INVENTION

Briefly, the invention relates to a method of producing glass, particularly fused silica glass, having improved initial transmittance in the UV wavelength region.

In one aspect, the inventive glass is produced by reacting such glass with hydrogen and/or deuterium.

In another aspect, the inventive glass is produced by treating glass with hydrogen at such temperature and for a duration sufficient to cause the hydrogen to diffuse into the glass.

Briefly, the invention relates to an optical member and method of forming an optical member or blank for use with light having a wavelength range shorter than about 360 nm The method includes the steps of forming a member or blank from high-purity synthetic silica glass, and treating the formed optical member or blank with molecular hydrogen to improve the deep ultraviolet transmission properties of the optical member or blank. In particular, the hydrogen treated optical member or blank formed by the method of the invention is useful at the KrF laser wavelength of 248 nm.

In one particularly useful aspect of the invention, an optical member or blank is formed from high purity fused silica glass by a) producing a gas stream containing a silicon-containing compound in vapor form capable of being converted through thermal decomposition with oxidation or flame hydrolysis to $SiO_2$; b) passing the gas stream into the flame of a combustion burner to form amorphous particles of fused $SiO_2$; c) depositing the amorphous particles onto a support; d) consolidating the deposit of amorphous particles into a transparent glass body and e) doping the transparent glass body with molecular hydrogen at high pressure and low temperature to form a glass member having high resistance to optical damage.

As used in the present specification: "optical damage" or "degradation in optical property" we mean (1) increase in birefringence, (2) increase in refractive index, (3) decrease in homogeneity, (4) decrease in transmission, and (5) increase in fluorescence; as related to the high purity fused silica of the invention, the terms "low hydroxyl group content" or "dry" mean that the OH sup-group content is less than 50 ppm;

BRIEF DESCRIPTION OF THE GLASS

FIG. 3b is a graph comparing the absorbance spectra of the glasses of FIG. 1a;

DETAILED DESCRIPTION OF THE INVENTION

Figure 1:
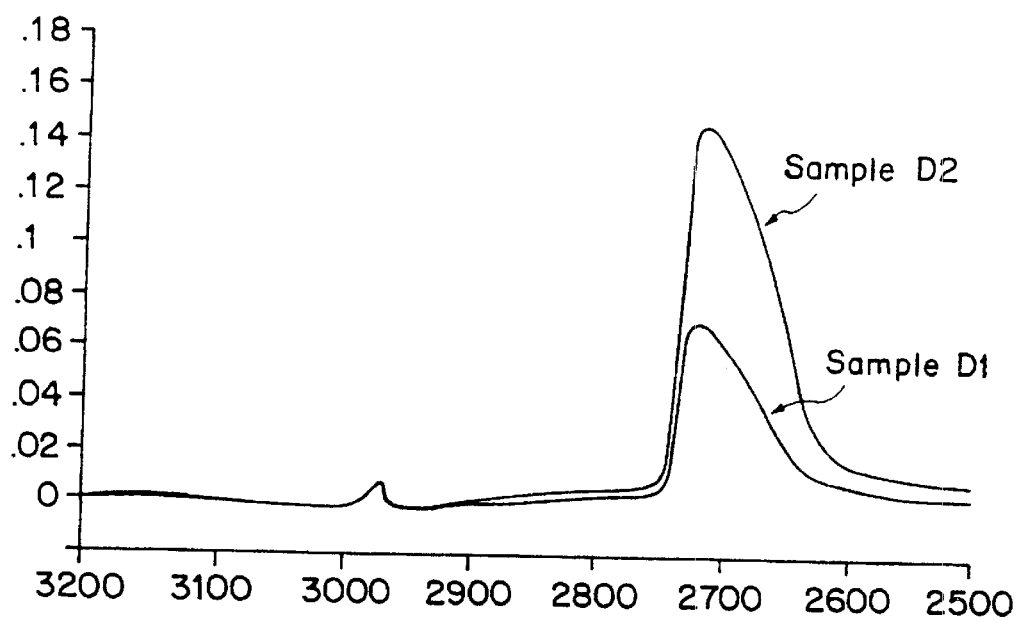
FIG. 1 shows the subtraction spectra of the reference glass sample (untreated), from those of two deuterium-treated samples.

We have observed that hydrogen treatment of optical glasses resulted in increased transmittance of the glass in the UV wavelengths. In order to better understand how initial transmittance can be affected by hydrogen, this work was then repeated using deuterium. Deuterium was used for the experiments to obtain spectroscopic evidence for the mode of action of hydrogen.

Low UV transmittance of fused silicas can in many cases be related to the presence of impurity metal ions and their charge compensating non-bridging oxygen ions in the glass. In many cases, the transmittance is not as high as it could possibly be because of the presence of these metal ion impurities which may be present in the raw materials, or which may become entrapped in the glass from the environment during the manufacturing process. In silica glass, these metal ion impurities do not enter the glass silicon-oxygen network, but their electric charge is compensated by the occurrence of non-bridging oxygen ions in the silicon-oxygen network. These non-bridging oxygen ions also contribute to absorption in the deep ultraviolet and vacuum ultraviolet spectral regions. Thus, the resulting structures give broad absorptions in the UV spectral range, thereby decreasing the glass transmittance.

Although details of the reaction are not fully understood, without intending to be bound by theory, the following may be proposed. The decrease in UV transmittance may be associated with a charge transfer-type absorption between the impurity metal ions and their non-bridging oxygen ligands, with their energy level difference lying within the energy band gap of the glass. Thus, one method of improving the transmittance of the glass is by reducing the charge transfer absorption between the metal ion impurities and the non-bridging oxygen in the glass.

The resulting reaction with hydrogen reduces the oxidation state of the metal ion impurities and converts the non-bridging oxygen into SiOH groups as described by the following equations:

$$Si\text{—}O^- + \tfrac{1}{2}H_2 \rightarrow SiOH + e^-$$

$$M^{+n} + e^- \rightarrow M^{n-1}$$

where $e^-$ is an electron and $M^{+n}$ is an impurity metal ion such as $Fe^{3+}$ and other transition metal ions for examples.

The increased transmittance results because either or both (a) the lowering of the energy level of the OH species relative to the O⁻ and (b) the raising of the energy level of the reduced species of the metal impurity ion. The ability to reduce will depend on the specific ion in question; for example, common multi-valent ions such as $Fe^{3+}$ will be easier to reduce than $Na^+$.

The amount of hydrogen and/or deuterium that can be diffused into the glass is dictated by the concentration in the ambient. The uniform concentration throughout the sample was assured by using the results of the diffusion equation with the diffusion coefficient of $H_2$ in $SiO_2$ given by:

$$D=(5.65 \times 10-4)\exp[-10.4/RT]$$

where, D=coefficient of diffusion

R=1.987×10–3 kcal/mol ° K.

T=temp, ° K.

The duration of the treatment with hydrogen and/or deuterium is calculated by the following equation:

$$t=L^2/4D$$

where, L=thickness of the glass; and D is as defined above to assure that 90% of the ambient concentration was present at the midpoint of the sample.

The required amount of hydrogen and/or deuterium will depend on the number of impurity ions and non-bridging oxygen ions present in the given glass. There is no requirement for excess molecular hydrogen and/or deuterium.

We have found that the benefits to be derived from the present invention are greater for those glasses having large numbers of impurity metal ions and non-bridging oxygen ions, than for glasses having relatively fewer impurity metal ions and non-bridging oxygen ions. Since the incremental improvement in transmittance is relatively less for the latter, the ability to observe improvements in the transmittance of glasses having very few non-bridging oxygen and metal ion impurity defects, will depend on the sensitivity of the measuring instrument.

Some high purity fused silica glasses contain a high concentration of SiOH as a result of the glass making process employed in the production of these glasses. This high initial concentration of SiOH makes it difficult to follow, spectroscopically, the formation of new SiOHs resulting from the hydrogen treatment. The use of deuterium, however, makes it possible to determine the amount of SiOD formed through the process. Increases in SiOD can then be correlated to improvements in UV transmittance.

In order to make the estimate of SiOD concentration as quantitative as the estimate of SiOH, the following procedure can be performed. The absorption peak assigned to molecular deuterium, $D_2$ is located at 2975 cm⁻¹. We have previously found that molecular hydrogen can be identified in the infrared when it is in sufficiently high concentrations, at 4136 cm⁻¹. Using a theoretical isotope substitution ratio of 1.39, $D_2$ should come at 2975 cm⁻¹. Referring to FIG. 1, for example, Example 1, this peak is found. The extinction coefficient of $D_2$ is estimated to be that of $H_2$, ~0.26 liters/mole cm, giving a final concentration of $D_2$ in Example 3 as approximately 2.3×10¹⁹ molecules/cc $SiO_2$. From the previous work, hydrogen concentration at this loading pressure is calculated to be 2.8×10¹⁹ molecules/cc $SiO_2$. This excellent agreement suggests that the use of the SiOH extinction coefficients for estimating SiOD concentration is justified.

A thermal scrambling of D for H by the reaction

Figure 2:
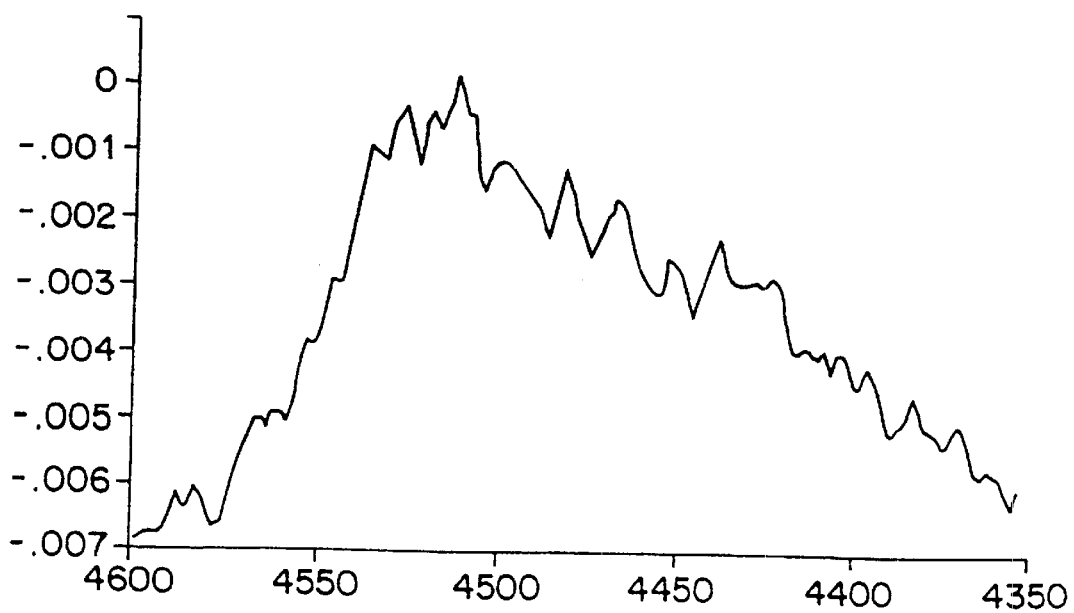
FIG. 2 is a subtraction spectrum of the reference glass sample from a deuterium-treated sample.

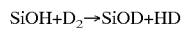

can be ruled out as the source of SiOD formed. This is determined by subtracting the overtone band of=SiOH (4520 cm⁻¹) in the reference sample from the same band in the deuterated samples. This is illustrated in FIG. 2. As shown, there is no change in SiOH concentration with high pressure deuterium treatment. The SiOD found in the IR experiment can then be related to the reaction of $D_2$ with non-bridging oxygens, the result of which is seen in increased UV transmittance.

We have found that increases in initial transmittance ($T_0$) are observed, for the most part, only when the glass has relatively low transmittance to begin with. The following examples were carried out using essentially 100% hydrogen and deuterium gases. However, suitable mixtures of hydrogen and inert gases such as argon or nitrogen, for example, 4% hydrogen and 96% nitrogen, may also be used. Other gaseous reducing agents such as carbon monoxide can also be used. Hydrogen and deuterium have the advantage that they can more readily be diffused into the glass to produce the desired reactions.

EXAMPLES

The examples below verify the improvement of transmittance by hydrogen treatment and also describe the mechanism by which this improvement is achieved.

Example 1

In order to verify the improvement of initial transmittance by high pressure hydrogen treatment, two pieces of 1×1.5×2 cm fused silica containing about 900 ppm of OH were deuterium treated at 90 atm, and 350° C., for 24 days. UV spectra, IR spectra and IR spectral subtractions were then obtained for the deuterium-treated samples (T1 and T2), and compared with those of the untreated sample (R1).

Figure 3A:
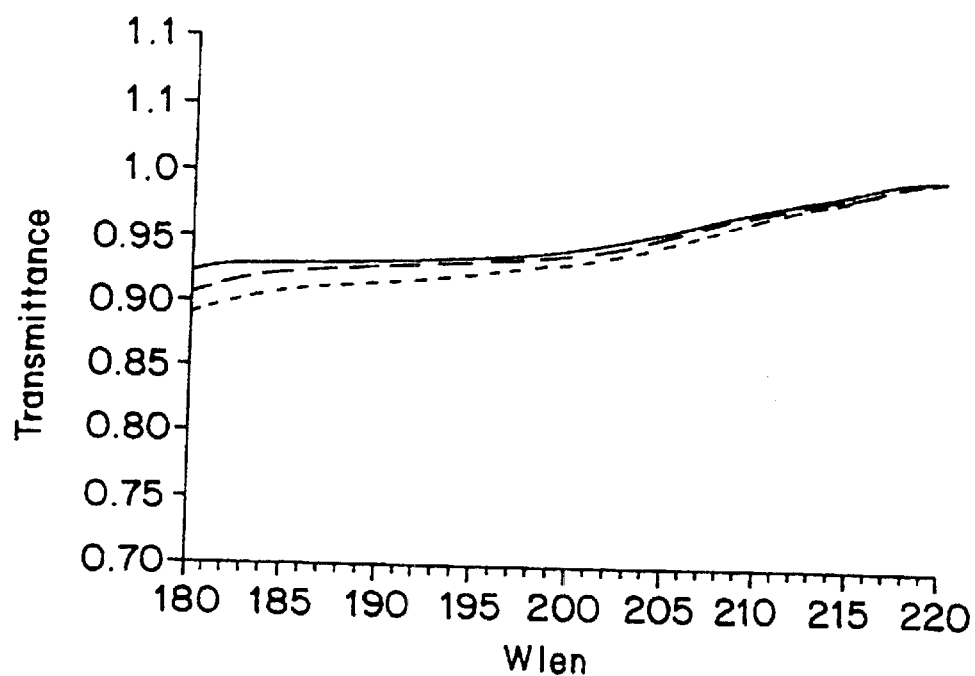
FIG. 3a is a graph comparing the transmittance of an untreated synthetic fused silica glass, with the transmittance of samples of the same glass, treated with deuterium at 350° C.
Figure 3B:
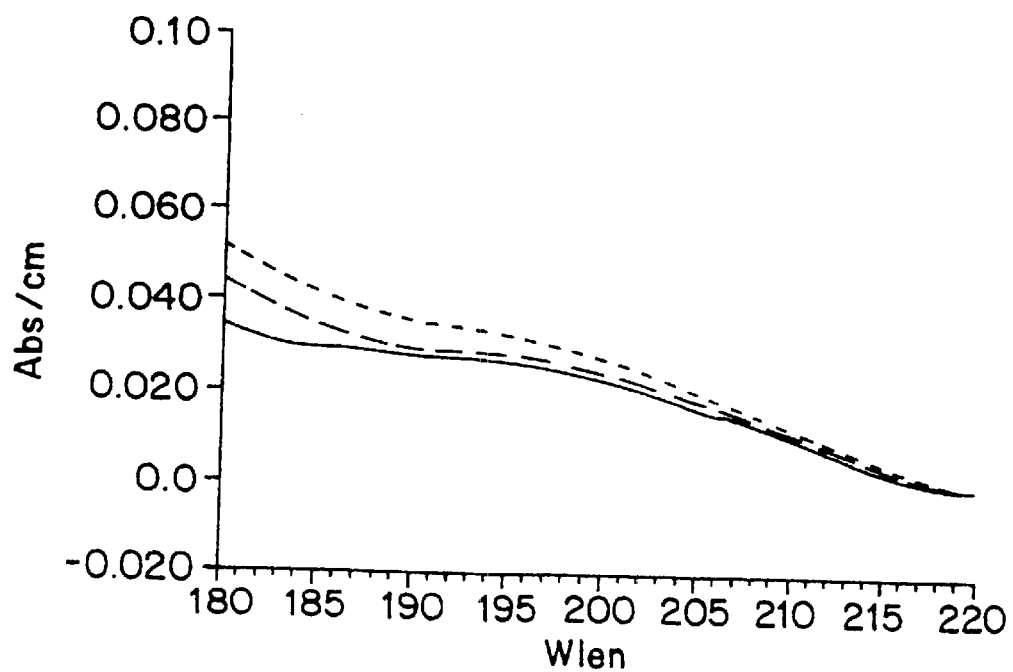

FIG. 3a shows the UV transmittance spectra of untreated glass and for the two deuterium treated samples, T1 and T2, from 180 to 220 nm. The spectra were normalized to give 100% transmittance at 220 nm. The transmittance of each sample at 193 nm were 0.9262 for reference sample R1, 0.9363 for the first deuterium-treated sample T1, and 0.9397 for the second deuterium-treated sample, T2. From the UV curves and from the transmittance numbers it is seen that there is a small but measurable improvement in transmittance in the UV after deuterium treatment. FIG. 3b show the spectra for all three samples in absorbance. As shown, the initial absorbance of the reference sample R1 was 0.0329, compared to 0.0284 and 0.0269 for deuterium-treated samples T1 and T2 respectively.

Figure 4:
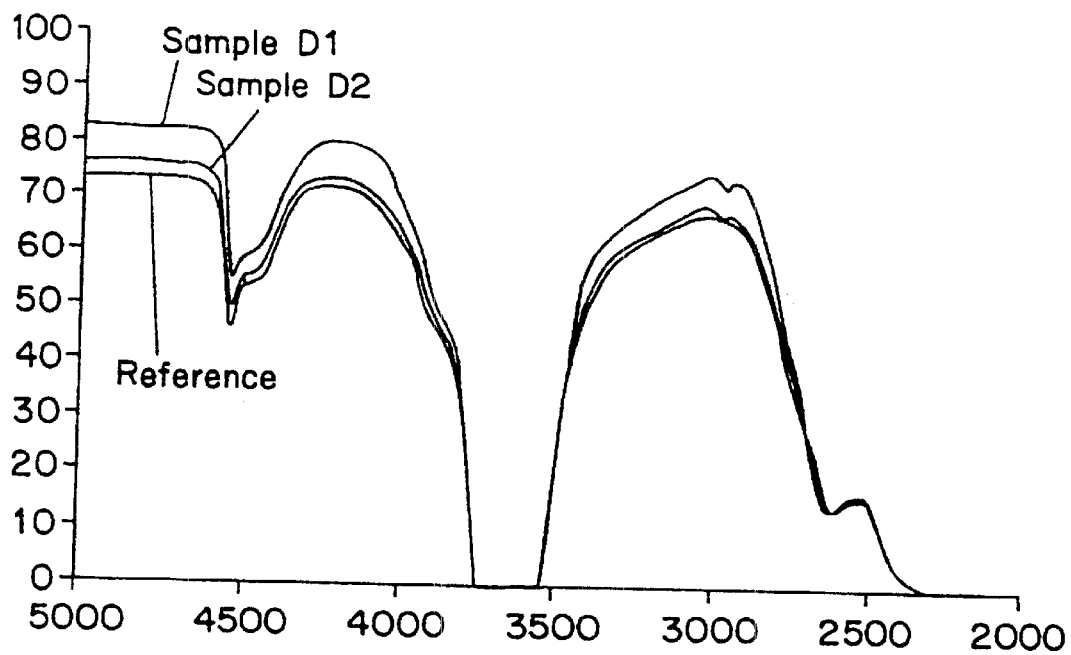
FIG. 4 is a graph comparing the infrared spectra of untreated glass with those of two samples treated with deuterium.

FIG. 4 shows the infrared spectra from 5000 to 2000 cm⁻¹ of the two deuterated samples and a reference glass (R1). For all the samples, the peak at high wavenumbers (~4520 cm⁻¹) can be attributed to an overtone of an OH and SiOH combination band. The strong band at about 3600 cm⁻¹ is the SiOH stretch, typically used for determination of OH concentration. The band at 4520 cm⁻¹ can also be used to calculate SiOH in thick samples or samples with high OH content.

The subtractions of the untreated reference glass from the deuterium treated glasses from 3200 to 2500 cm⁻¹ are shown in FIG. 1. The subtraction spectra clearly show the presence of a peak at 2720 cm⁻¹. This peak is attributed to SiOD which is the result from the deuterium treatment of the glasses, by the reaction described above. The shift, at 2720 cm⁻¹, agrees well with what would be expected from isotopic substitution of H for D.

Figure 5:
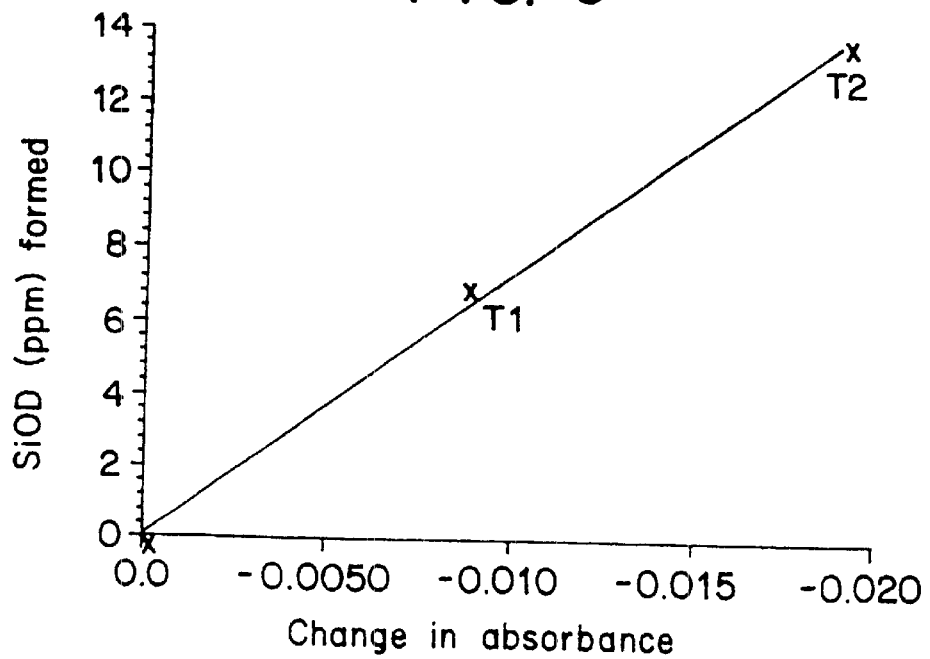
FIG. 5 is a graph of the change in absorbance versus the parts per million (ppm) by weight OD formed.

It is seen that the sample that exhibits a greater increase in initial UV transmittance also has more SiOD (sample T2). A plot of SiOD vs. change in absorbance for the three samples is presented in FIG. 5. The line shows a modest agreement of SiOD formation with increased UV transmittance.

The results of the increased transmittance with formation of SiOD are in accordance with the observation that glass having poor initial transmittance benefits more from hydrogen treatment than does glass having high initial transmittance.

Example 2

Figure 6A:
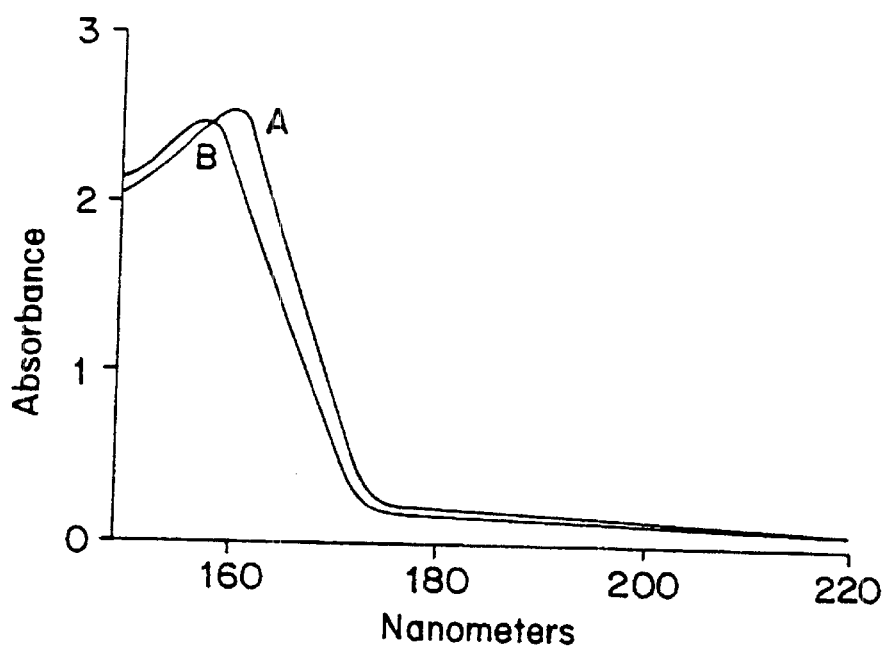
FIGS. 6a and 6b compare the absorbance spectra of untreated glass with those of the same glass treated after treatment with hydrogen at 600° C.
Figure 6B:
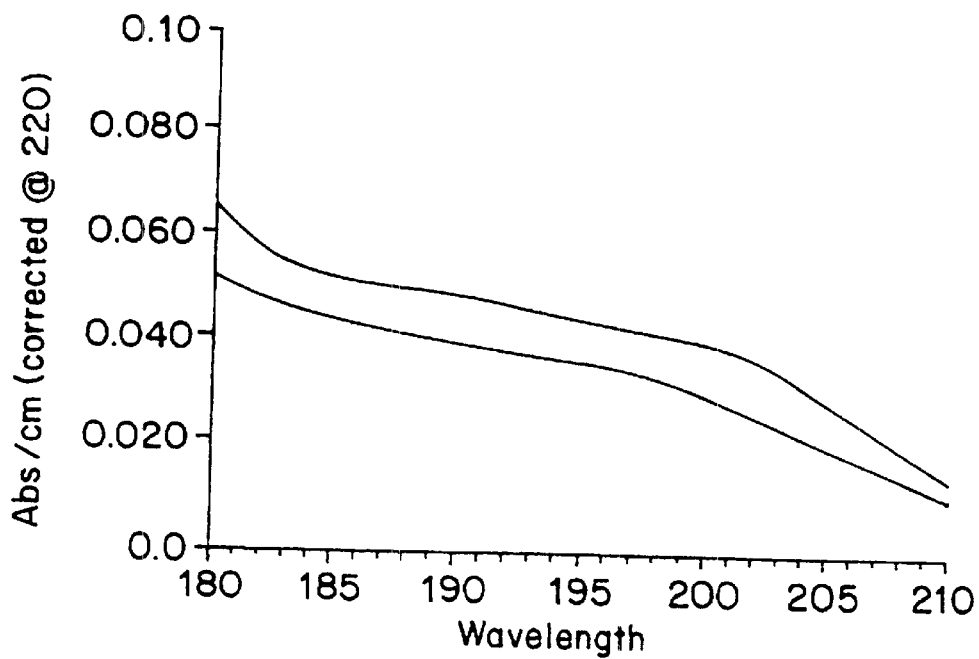

Hydrogen/deuterium impregnation of fused silica samples was carried out, at 600° C., 1 atm, for 48 hours. This time was chosen in accordance with the diffusion equation for hydrogen in silica at 600° C. for a 1 cm thick piece. Vacuum UV spectra (FIGS. 6a and 6b), recorded before and after the low pressure hydrogen treatment show a significant increase in initial transmittance as a result of the treatment. As in Example 1 and FIGS. 1 through 5, we have again shown that initial transmittance is improved by hydrogen treatment. This result shows that high pressure hydrogen treatment is not necessary in order to improve initial UV transmittance in fused silica.

Also, in this example, samples of Corning glass codes 7940 and 7980 were subjected to 600° C., 48 hours, 1 atm hydrogen treatment. Table 1 compares the transmittance/cm of the glasses at 210 nm and 248 nm before and after this hydrogen treatment.

TABLE 1

Transmittance/cm before and after hydrogen

| Sample | 210 nm Before/After | 248 nm Before/After |
|---|---|---|
| 1 | 86.7/90.0 | 90.0/91.7 |
| 2 | 79.5/89.9 | 84.5/91.4 |
| 3 | 80.1/90.2 | 86.4/91.9 |
| 4 | 89.7/90.4 | 91.4/92.0 |
| 5 | 86.6/89.3 | 90.2/91.4 |
| 6 | 82.0/88.7 | 88.0/91.4 |
| 7 | 81.5/87.3 | 88.6/91.6 |
| 8 | 84.4/86.9 | 88.3/89.7 |

Example 3

In this example, silica was made by the densification of a powder precursor and subsequently treated in hydrogen at 600° C. as above. The ultraviolet transmittance of the glass was measured before and after hydrogen treatment. Transmittance/cm and hydroxyl content, as determined by infrared, of the sample before and after hydrogen treatment are shown in Table 2 below.

TABLE 2

Transmittance and OH of powder process glass.

|  | 210 nm | 248 nm | OH(wt, ppm) |
|---|---|---|---|
| Before | 70.9 | 82.1 | <1 |
| After | 76.0 | 88.9 | 4 |

The present invention can be applied to any glass intended for use in the ultraviolet range to improve the initial transmittance. In our preferred embodiment, the method is applied to fused silica produced from silicon tetrachloride or a halide-free polymethylsiloxane. Preferred polymethylsiloxanes include, hexamethyldisiloxane, polymethylcyclosiloxane, and mixtures of these. In one particularly useful embodiment, the fused silica is made from a polymethylcyclosiloxane such as, octamethylcyclotetra-siloxane, decamethylcylcopentasiloxane, hexamethylcyclotrisiloxane, and mixtures of these.

Figure 7:
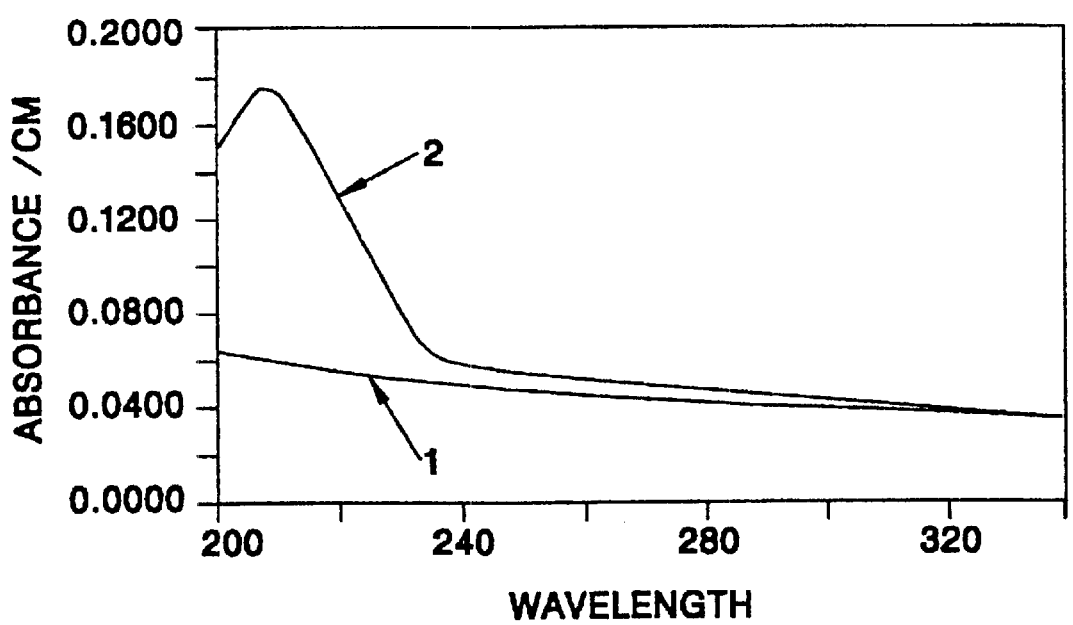
FIGS. 7, 8, 9 and 10 are graphical representations comparing the optical absorption spectra of fused silica glass articles treated in accordance with the present invention with spectra of untreated articles after both are exposed to laser radiation.

The invention will be described below with reference to the drawings. Typical optical absorption spectra of Glass Code 7940, a high purity fused silica glass available from Corning Incorporated, both before and after exposure to about $10^6$ KrF excimer pulses (248 nm, 250 mJ/cm$^2$) are shown in FIG. 7, by lines 1 and 2 respectively. As shown, there is an additional absorption at about 210 nm caused by the laser exposure. As stated earlier, this absorption band is due to the occurrence or formation of E' centers.

Figure 8:
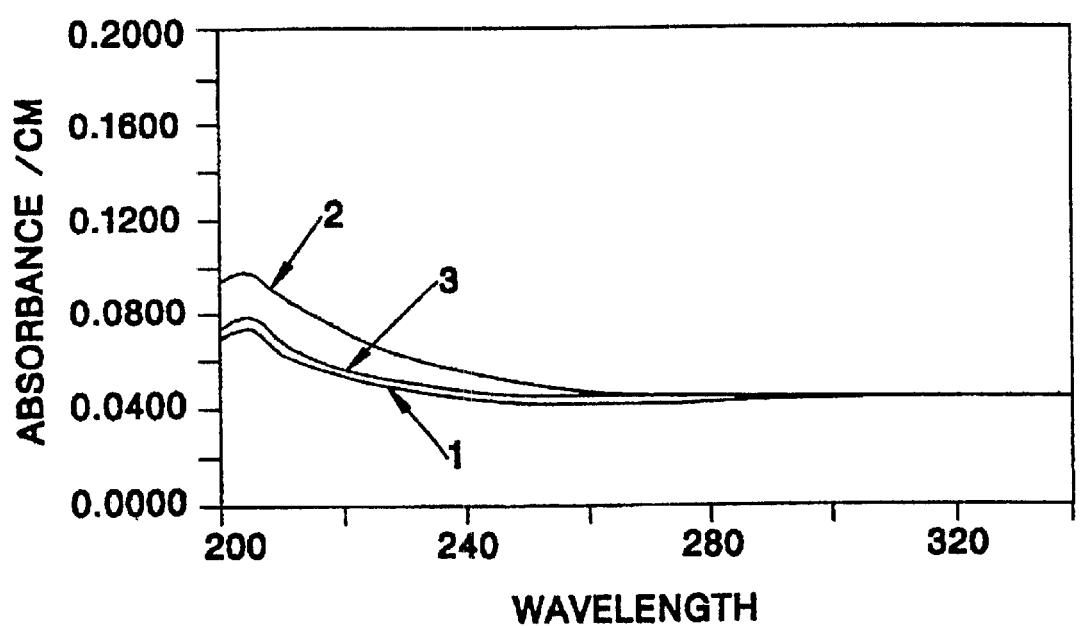

To show that the E' center reacts with hydrogen, a 0.5 mm thick sample of previously damaged fused silica such as shown in FIG. 7, was placed in 12 atm. of $H_2$ for 43 days at 85° C. This schedule was determined to be sufficient to fully infiltrate the sample with $H_2$. After removal from the $H_2$, the absorption spectrum was remeasured. The absorption spectrum of the hydrogen-treated sample is shown in FIG. 8 by line 3. As shown, the absorption spectrum previously attributed to the E' center in the untreated sample was eliminated by the hydrogen treatment. Optical damage due to the E' center is clearly evident in the spectrum of the untreated fused silica sample after laser exposure (line 2). As shown, the spectrum of the hydrogen-treated sample, after exposure to laser radiation (line 3) is essentially identical to that of the unexposed sample (line 1). ESR measurements confirmed the absence of the E' center in the treated sample. While not intending to be bound by theory, it is believed that the E' center may have reacted with the $H_2$ to form a SiH bond.

Accordingly, the object of the present invention, that is, to make high purity glass, is achieved by forming high purity fused silica glass and subsequently subjecting the formed glass to a post-treatment involving exposure to hydrogen. Preferably, the glass is impregnated with a sufficient amount of hydrogen at a high pressure to provide resistance to optical damage at the KrF laser wavelength region of 248 nm as well as the ArF laser wavelength region of 193 nm.

As stated earlier, it has been generally taught that high OH silicas are more resistant to optical damage than low OH silicas. As a result, it has been broadly suggested that in order to produce fused silica glass members having acceptable optical damage resistance, high OH content silicas are the material of choice. This approach of using only high OH silicas however, ignores a large group of fused silica glass which are inherently low in OH content. For example, high purity fused silica made by such known methods as CVD-soot remelting or soot deposition process, plasma CVD process, electrical fusing of quartz crystal powder, and flame hydrolysis process, are generally characterized by low to substantially no OH content. Until now, there have been little or no practical methods for increasing the optical damage resistance of this group of glass. We have found that by using the method of the present invention, the optical damage resistance of high purity fused silica glass in general, regardless of OH content, can be significantly increased. In particular, we have found that by using the method of the invention, even low OH fused silica glass, which have hitherto been considered impractical for many laser applications, can be made useful for such applications. Using this method, such glass can be made to become as resistant to optical damage as fused silica glass having high OH content.

We have found that by using the method of the invention, high purity fused silica can be made resistant to optical damage in ultraviolet radiation in the wavelength range of 250 nm or less. The method includes (1) forming a blank from high purity synthetic silica glass, and (2) doping the blank with molecular hydrogen at a pressure and temperature sufficient to impregnate the blank with an amount of hydrogen necessary to increase the resistance of the resulting glass member to laser damage.

The blank can be made from any known method capable of producing high purity fused silica glass. Examples of such known methods include the CVD-soot remelting or soot deposition process, plasma CVD process, fused silica boule process, electrical fusing of quartz crystal powder, and flame hydrolysis process. The actual method selected will depend on such considerations as the desired OH content and other considerations. For example, where it is desirable to use low OH fused silica glass, such glass may be prepared as disclosed in commonly assigned U.S. Pat. Nos. 5,043,002, and 3,933,454, both herein incorporated by reference.

One method of making low OH fused silica is by the flame hydrolysis process. In a conventional flame hydrolysis method, a coating of flame hydrolysis-produced glass soot is deposited on a starting member to form a soot preform. The preform is consolidated to form a dense glass layer which can then be formed into a desired shape. In the consolidation step, the soot preform is subjected to a temperature in the consolidation temperature range for a time sufficient to permit the soot particles to fuse and consolidate, thereby forming a dense glass layer which is free from particle boundaries. Preferably, the fused silica glass used to form the optical member of the invention is made from the improved flame hydrolysis process as described in U.S. Pat. No. 3,933,454. In the consolidation step of the latter process, the soot preform is heated to a temperature within the consolidation temperature range for a time sufficient to cause the soot particles to fuse and form a dense glass layer, and simultaneously subjected to a stream of a substantially dry chlorine containing atmosphere.

High OH fused silica useful in the invention can be made by any known method such as the fused silica boule process. In a typical fused silica boule process, an inert gas, nitrogen, is used as a carrier gas and a bypass stream of the nitrogen is introduced to prevent saturation of the vaporous stream. The vaporous reactant is passed through a distribution mechanism to the reaction site where a number of burners are present in close proximity to a furnace crown. The reactant is combined with a fuel/oxygen mixture at the burners and combusted and oxidized at a temperature greater than 1700° C. The high purity metal oxide soot and resulting heat is directed downward through the refractory furnace crown where it is immediately deposited and consolidated to a mass of glass on a hot bait.

In one particularly useful embodiment of the invention, an optical member having high resistance to laser damage is formed by doping high purity fused silica glass with molecular hydrogen at a pressure and temperature, and for a time sufficient to impregnate the glass with a sufficient amount of hydrogen to make the glass resistant to laser damage. In this embodiment, the fused silica blank is formed by:

a) producing a gas stream containing a silicon-containing compound in vapor form capable of being converted through thermal decomposition with oxidation or flame hydrolysis to $SiO_2$;

b) passing the gas stream into the flame of a combustion burner to form amorphous particles of fused $SiO_2$ c) depositing the amorphous particles onto a support; and d) consolidating the deposit of amorphous particles into a transparent glass body.

If a low OH fused silica blank is desired, the amorphous particles are consolidated in a chlorine-containing environment to remove the water and purify the glass. In one preferred process, the deposit of amorphous particles are consolidated in a He/HCl-containing atmosphere to form a transparent glass body having OH content less than 10 ppm. In those applications where low OH is not particularly desired, the amorphous particles can be consolidated in a non-chlorine-containing atmosphere.

The resulting glass body or blank, can then be doped with molecular hydrogen at high pressure and low temperature to form a glass member having high resistance to optical damage in ultraviolet radiation in the wavelength range of 300 nm or less, even in glasses having an $OH^-$ content below 50 ppm.

Useful silicon-containing compounds for forming the glass blank preferably include any halide-free cyclosiloxane compound, for example, polymethylsiloxane such as hexamethyldisiloxane, polymethylcyclosiloxane, and mixtures of these. Examples of particularly useful polymethylcyclosiloxane include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula

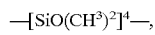

is used as the feedstock for the fused silica boule process, or in the vapor deposition processes such as used in making high purity fused silica for optical waveguide applications. In addition to halide-free cyclosiloxane compounds, $SiCl^4$ can also be used as the feedstock in the silica boule process to produce high purity fused silica of the invention provided that the $OH^{31}$ content is low. However, for safety and environmental reasons, halide-free, cylcosiloxane compounds are preferred. By low $OH^{31}$ content, we mean that the OH concentration is less than 50 ppm. In fact, our invention can be utilized with glasses having OH content less than 20 ppm or even less than 10 ppm, measured from values of the $\beta^-OH$.

As stated above, the high purity fused silica blank is subjected to treatment in a hydrogen environment for a time sufficient to render the fused silica resistant to optical damage when exposed to high intensity short wave radiation. In particular, the hydrogen treatment continues for a time sufficient to prevent the 190–300 nm optical absorption of fused silica associated with prolonged exposure to 248 nm or 193 nm excimer laser.

The treatment temperature is determined by the temperature at which reaction of hydrogen with silica is observed. Preferably, the treatment is done to improve the impregnation of hydrogen into the glass since the solubility of hydrogen is higher at lower temperatures. In addition to equipment limitations, the upper limit of the pressure will depend on the desired amount of hydrogen to be infused into the glass, the thickness of the glass and other variables. Preferably, the glass blank is doped in hydrogen at a temperature of about 500° C. or less, more preferably, less than about 350° C. and at a pressure above 150 atmospheres. Increased pressure makes it possible to impregnate glass in a shorter period of time and provides protection against greater levels of exposure. It should be appreciated that sufficiently high pressures entail practical difficulties.

Therefore, the maximum pressure will be determined by the practical limitations of the available apparatus. Similarly, the duration of the treatment will depend on the optical length of the glass member or blank, the temperature and pressure, as well as other variables. For any desired application, the optimum temperature, pressure and duration can be determined by experimentation.

Example 4

In one example, a sample of high purity fused silica glass prepared by the soot process and having very low OH content was loaded with $H_2$ in the manner described above and then exposed to excimer laser (250 mJ/cm$^2$ at 248 nm). The amount of $H_2$ infiltrated into the glass was estimated to be about 600 ppm molar (that is, $H_2/SiO_2$) or about $10^{19}$ $H_2$ molecules/cm$^3$ of glass. Effectively, this amount of hydrogen would protect against the creation of $10^{19}$ E' centers. With $10^6$ pulses, ESR measurements indicated that about $10^{15}$–$10^{16}$ E' centers would be created. Based on our calculations, we estimate that the amount of dissolved hydrogen is roughly linear with the pressure of hydrogen.

Example 5

Figure 9:
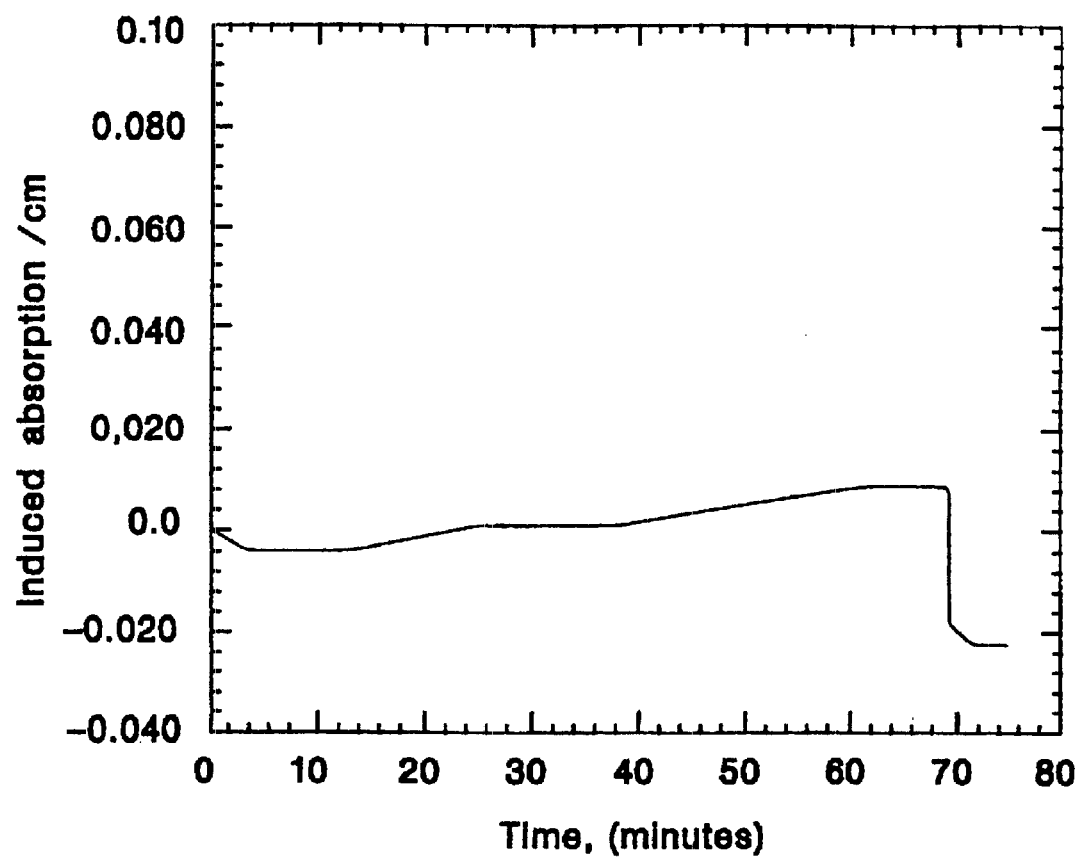
Figure 10:
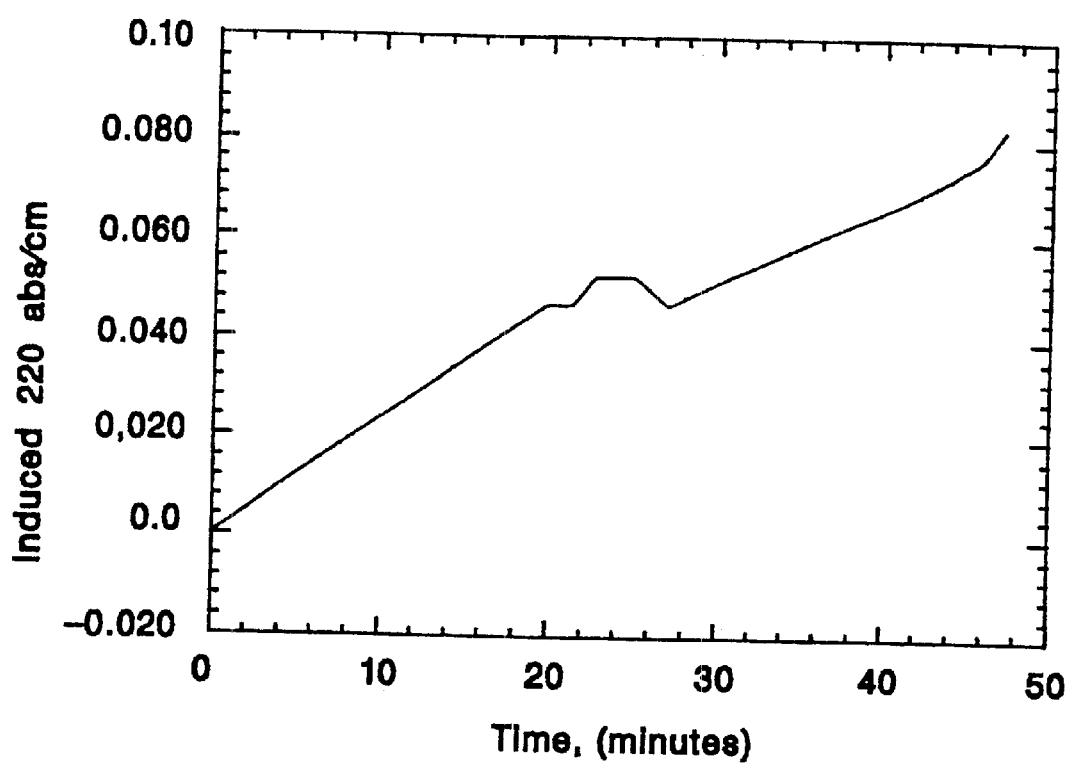

The following example was carried out using fused silica sample prepared by the soot process using as the silica source, octamethylcylcotetrasiloxane (OMCTS). A sample, having a 5 mm path length was placed in a Parr pressure reactor at 275° C. at 1180 psi of $H_2$ for twenty days. This time (20 days) corresponded to a loading of hydrogen to 90% of the ambient at the midplane of the sample. The sample was then exposed to 248 nm excimer laser irradiation, 350 mJ/cm$^2$ at 400 Hz for a total of 13 million pulses. The optical spectrum measured on-line, during the final 1 million pulses is shown in FIG. 9. As a reference, the measured on-line induced absorption that occurs in an untreated sample of silica is shown in FIG. 10. As shown, the induced absorption is less than 0.01 cm$^{-1}$ at 220 nm for the hydrogen-treated sample after 13 million pulses of exposure (FIG. 9, compared to close to 0.1 cm$^{-1}$ for the untreated sample after only 1 million pulses (FIG. 10). The 220 nm absorption which is clearly evident in the untreated sample is attributed to the E' center.

The concentration of the molecular hydrogen is estimated to be about $4\times10^{20}$. We also estimate that the exposure produced the order of about $10^{17}$ centers.

In addition to the embodiments discussed above, it will be clear to persons skilled in the art that numerous modifications and changes can be made to the above invention without departing from its intended spirit and scope.

What is claimed is:

1. A method of forming a deep UV fused silica optical glass member blank, the method comprising the steps of:
    providing a fused silica optical glass blank having a plurality of metal ion impurities and non-bridging oxygens, said fused silica optical glass blank having a 248 nm transmittance/cm,
    subjecting the fused silica optical glass blank to a gas selected from the group consisting of hydrogen, deuterium, carbon monoxide and mixtures of these at a temperature in the range of 350° C. to 600° C. and a pressure in the range of 1 to 90 atm for a duration sufficient to cause the gas to diffuse into the fused silica optical glass and wherein said diffused gas reacts with the fused silica metal ion impurities and non-bridging oxygen and increases the 248 nm transmittance/cm of said fused silica optical glass.

2. The method of claim 1, wherein the metal ion impurities comprise transition metal ions.

3. The method of claim 2, wherein the transition metal ions are multi-valent ions.

4. The method of claim 1, wherein the fused silica optical glass has a charge transfer absorption between the metal ion impurities and the non-bridging oxygen.

5. The method of claim 4, wherein the transmittance of the fused silica optical glass is improved by reducing said charge transfer absorption.

6. The method of claim 1, wherein said metal ion impurities include iron.

7. The method of claim 1, wherein the fused silica is formed from SiCl$_4$.

8. The method of claim 1, wherein the fused silica is formed from a halide-free polymethylsiloxane.

9. The method of claim 8, wherein the polymethylsiloxane is selected from hexamethyldisiloxane polymethylcyclosiloxane and mixtures of these.

10. The method of claim 9, wherein the polymethylcyclosiloxane is selected from the group consisting of octamethylcyclotetrasiloxane, decamethylcyclopentasiloxane, hexamethylcyclotrisiloxane, and mixtures of these.

11. A method of improving the 248 nm transmittance of a deep UV fused silica optical glass, the fused silica optical glass being formed from a halide-free polymethylsiloxane selected from the group consisting of hexamethyldisiloxane, octamethylcyclotetrasiloxane, decamethylcyclopentasiloxane, hexamethylcyclotrisiloxane, and mixtures of these; the fused silica optical glass having a plurality of metal ion impurities and non-bridging oxygens, a charge transfer absorption between the metal ion impurities and the non-bridging oxygens, and a 248 nm transmittance/cm no greater than 91.4%, the method comprising the step of:
    subjecting the deep UV fused silica optical glass to a gas selected from the group consisting of hydrogen and deuterium at a temperature and for a duration sufficient to cause the gas to diffuse into and react with the fused silica optical glass, wherein the step of subjecting improves the 248 nm transmittance/cm of the deep UV fused silica optical glass from 0.6% to 6.9% by reducing said charge transfer absorption.

12. A method of producing deep UV fused silica optical glass blanks, said method comprising the steps of:
    providing a fused silica glass having an initial 248 nm transmittance/cm no greater than 91.4% and a plurality of metal ions and non-bridging oxygen ions,
    subjecting said provided fused silica glass to a hydrogen treatment gas at a temperature and a duration sufficient to cause the hydrogen to diffuse into the fused silica glass and react with the metal ions and non-bridging oxygen ions to result in hydrogen being bonded to the non-bridging oxygen ions and reducing the metal ions, wherein said subjected fused silica glass has an increased 248 nm transmittance/cm, said increased 248 nm transmittance/cm is between 0.6% and 6.9% greater than said initial 248 nm transmittance/cm.

13. The method of claim 12, wherein the step of providing a fused silica glass includes providing a fused silica glass containing about 900 ppm wt. OH.

14. The method of claim 12, wherein the step of providing a fused silica glass includes providing a fused silica glass containing <1 ppm wt. OH.

15. A method of forming a deep UV fused silica optical glass member blank, the method comprising the steps of:

providing a fused silica optical glass blank having a plurality of metal ion impurities and non-bridging oxygens, said fused silica optical glass blank having a 248 nm transmittance/cm, subjecting the fused silica optical glass blank to a gas selected from the group consisting of deuterium, carbon monoxide and mixtures of these at a temperature and for a duration sufficient to cause the gas to diffuse into the fused silica optical glass and wherein said diffused gas reacts with the fused silica metal ion impurities and non-bridging oxygen and increases the 248 nm transmittance/cm of said fused silica optical glass.

* * * * *